2,993,074
Patented July 18, 1961

2,993,074
PROCESS FOR THE PRODUCTION OF PHENOLS BY DECOMPOSITION OF ARALKYL HYDROPEROXIDES
Alvin F. Shepard, Le Roy, N.Y., assignor to Hooker Chemical Corporation, a corporation of New York
No Drawing. Filed Feb. 10, 1958, Ser. No. 714,058
11 Claims. (Cl. 260—593)

This invention relates to the production of phenols. More particularly, it refers to a process for the decomposition of hydroperoxides of alkyl-substituted aryl hydrocarbons to phenols and carbonyl compounds.

During the recent past, a new process has been developed for the production of phenols. This process consists generally in oxidizing an alkyl substituted aryl hydrocarbon to form an aryl alkyl hydroperoxide and then decomposing the hydroperoxide to form a phenol. The present invention is concerned with the second step of the overall process, the step which comprises reacting the aryl alkyl hydroperoxide with a decomposition agent to produce a phenol and a carbonyl compound.

Among the earliest experiments concerned with decomposition of hydroperoxides were those performed by Wieland & Maier, Ber. 64B, 1205–1210 (1931). They first prepared triphenylmethyl hydroperoxide by heating triphenylmethyl chloride with sodium peroxide and then heated the triphenylmethyl hydroperoxide above its melting point where it decomposed to give phenol and benzophenone.

It was later shown by Hock & Lang, Ber. 77B, page 257 (1944) that when isopropylbenzene is subjected to the action of molecular oxygen when exposed to shortwave radiation, isopropylbenzene hydroperoxide is formed, and that this hydroperoxide may then be decomposed by refluxing for one and one-half hours with ten percent aqueous sulfuric acid to produce phenol and acetone. The yield of phenol thus obtained was seventy-five percent of theoretical.

A later experimenter in this field, Kharasch, accomplished the decomposition of cumene hydroperoxide by using as a decomposition agent a solution of a small amount of perchloric acid dissolved in acetic acid. Kharasch, J. Org. Chem. 15, 748 (1950).

In each of the previous methods there are various disadvantages. Where aqueous sulfuric acid is used as the decomposition agent, there is an additional step introduced into the process, since the water must be removed from the final reaction product. Furthermore, the solubilities of aralkyl hydroperoxide and aqueous sulfuric acid in one another are limited so that long periods of heating, high temperature and strong agitation are required to complete the desired decomposition. Then too, it is often desirable to decompose hydrocarbon solutions of peroxide such as result from the partial oxidation of hydrocarbons. (It is of course, well known that hydrocarbons are insoluble in most aqueous solutions.) This avoids the operational step employed by the Hock and Kharasch methods in which they extracted the hydroperoxide from the product obtained by partial oxidation of cumene. In the present process, no such extraction step is necessary or desirable or practiced, whereas in the prior art, in case the hydroperoxide has not been separated from the accompanying hydrocarbon, the mutual solubilities of aqueous sulfuric acid and the hydroperoxide-hydrocarbon mixture are even further reduced, with the result that still more time, higher temperature, and a violent agitation are required for completion of the desired decomposition.

The use of solutions of perchloric acid in acetic acid as recommended by Kharasch reduces the difficulty of obtaining mutual solubility between the acids and the hydroperoxide. However, this method also suffers from the fact that the added component, acetic acid, must be removed from the reaction product, which is again an additional step. Phenols react with acetic acid, particularly in the presence of strong acid catalysts, form acetic acid esters and the yield of phenol resulting from the decomposition is thereby reduced. Perchloric acid is an explosive agent and the danger of explosions resulting from handling mixtures of perchloric acid with organic materials are so well kwown as to require no comment. In addition, it has been true of many of the previous processes that the reaction efficiencies obtained have left something to be desired.

It is an object of the present invention to conduct the decomposition of the hydroperoxide in a homogeneous medium. It is a further object to conduct the decomposition in a medium containing only very small amounts (0.001–1.0 percent calculated on the hydroperoxide) of strong acid and in the substantial absence of water.

It is also an object of the present invention to improve the efficiency of the decomposition reaction, whereby an aryl alkyl hydroperoxide is decomposed to yield a phenol and carbonyl compound in such a manner that the yield of the desired phenol will be greater and the amount of by-products formed through side reactions will be kept at a minimum.

It is a further object of the present invention to provide a means for decomposing hydroperoxides containing more than one hydroperoxy group per molecule into carbonyl compounds and phenols containing more than one phenolic hydroxyl per molecule.

It is a further object of this invention to provide a means for decomposing hydroperoxides of high melting point, such as triisopropylbenzene trihydroperoxide.

Another object of this invention is to provide a means for decomposition of mixed hydroperoxides such as result from the peroxidation of for example triisopropylbenzene.

It is also an object of the present invention to carry out the decomposition process in such a manner as to reduce the number of necessary steps and the expense involved in the separation of the resulting product from the reaction mixture. It is a further object to carry out the decomposition process with decomposition agents that will allow a wide range of operating conditions to be utilized.

Other objects and a fuller understanding of the invention may be had by referring to the following description and claims.

In accordance with the present invention, it has been discovered that aryl alkyl hydroperoxides may be decomposed to the corresponding phenols and carbonyl compounds in excellent yields by reacting the hydroperoxide in a homogeneous medium comprising a phenol and a small amount of a strong acid such as sulfuric acid, hydrogen chloride, aluminum chloride, organosulfonic acid, or a halogenated carboxylic acid. The amount of acid used may vary from 0.001 percent to 1 percent by weight based on the hydroperoxide. The temperatures at which the decomposition is carried out may vary from the melting point of the reaction mixture to about the boiling point of the phenol.

It has further been found in accordance with the teachings of the present invention that if a homogeneous medium is to be realized for carrying out the decomposition reaction that the system should be substantially anhydrous and that the amount of strong acid should be kept at a low percentage of the weight of the hydroperoxide. In addition to the disadvantages mentioned previously regarding the use of aqueous acid solutions, the utilization of a substantially anhydrous system is advantageous also to avoid contamination of the products with water and to avoid the corrosion of iron equipment which results from the action of aqueous acids. The use of minimum amounts of concentrated acid is advantageous since it avoids the waste of acid and the difficulties attendant to removing it or its reaction products from the phenol and carbonyl compound obtained in the decomposition reaction.

One method of carrying out the instant invention is illustrated as follows:

The hydroperoxide which is to be decomposed may be prepared by the oxidation of alkyl-substituted aromatic compounds which have the following structural formula—

where R and $R_1$ represent either alkyl groups or hydrogen, and Ar may be either an aryl group or an alkyl-substituted aryl group. The oxidation is carried out by passing air through the particular hydrocarbon involved while the temperature of the hydrocarbon is kept between about twenty-five degrees centigrade and about two hundred and fifty degrees centigrade, with the particular temperature dependent upon the hydrocarbon involved. The stream of oxygen is preferably broken up by means of a dispersing orifice.

The hydroperoxide formed has the general structure:

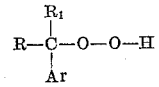

in which R and $R_1$ represent either alkyl groups or hydrogen, and Ar represents either an aryl group or an alkyl-substituted aryl group.

Either the total reaction mixture containing the hydroperoxide, as produced above, may be subjected to the cleavage as such, or where such may be desirable, the hydroperoxide may be first isolated. In either case, that is with either the total reaction mixture or with the isolated hydroperoxide, both of these are considered to be the peroxidation product of the starting hydrocarbon and both therefore are considered and meant to be embraced within the connotation of the term "peroxidation product" as used in the claims. In carrying out a batch operation, this mixture is introduced with continuous stirring into the decomposition mixture consisting, for instance, of a solution of 0.05 percent sulfuric acid in phenol, $C_6H_5OH$, and maintained at a temperature of fifty-five degrees centigrade. The reaction proceeds rapidly and may generally be completed in about fifteen minutes. The phenol resulting from the cleavage of the hydroperoxide is separated from the reaction mixture by any of several well-known methods. It is preferable that the sulfuric acid be neutralized before the separation is carried out. It is generally preferable to subject the peroxidation product to the cleavage without separating the hydroperoxide from the unoxidized hydrocarbon, since this procedure results in the elimination of one purification step.

It is also generally preferable that the phenol which is used as the cleavage or decomposition agent be the same phenol which is the resultant end product of the decomposition reaction. The advantage accruing therefrom resides in the fact that such a procedure eliminates one of the steps of separation of the impurities from the final reaction product. For example, when a solution of a small amount of concentrated sulfuric acid in acetic acid is used to decompose cumene hydroperoxide, one of the steps in the process involves the removal of the acetic acid from the reaction mixture. However, when a solution of concentrated sulfuric acid in phenol is used this step is obviated since the phenol added is taken off together with the phenol that results as the reaction product. This accomplishes a considerable saving.

The process of the present invention may be utilized to decompose any of a large number of hydroperoxides. Among them are the hydroperoxides of cumene, o-, m-, and p-cumene, o-, m-, and p-diisopropylbenzene, 1,3,5-triisopropylbenzene, 1,2,3-triisopropylbenzene, and various other substituted benzene and naphthalene hydrocarbons where at least one of the carbons attached to the aryl ring is a tertiary carbon. In some cases, it is even possible to decompose the hydroperoxide of an alkyl-substituted aryl hydrocarbon where the carbon attached to the aryl ring is a secondary or even a primary carbon. Some examples of these reactions are the decomposition of triethylbenzene hydroperoxide to diethylphenol and acetaldehyde, and the decomposition of durene hydroperoxide to trimethyl phenol and formaldehyde. Thus the preferred compounds of the present invention are those having lower alkyl radicals. The hydroperoxides of the above-mentioned hydrocarbons as utilized in the present invention may be either mono-, di-, or trihydroperoxides. For example, when m-diisopropylbenzene hydroperoxide is decomposed in the reaction of the present invention, the phenol formed will be m-isopropylphenol. On the other hand, when m-diisopropylbenzene dihydroperoxide is used, the resulting product will be resorcinol. In the case of 1,3,5-triisopropylbenzene, when the monohydroperoxide is used, the resulting product will be 3,5-diisopropylphenol. When the dihydroperoxide is used, the resulting product will be 5-isopropylresorcinol. When 1,3,5-triisopropylbenzene trihydroperoxide is used, the resulting product will be phloroglucinol. When compounds other than cumene hydroperoxide are decomposed, the phenol used as the solvent for the sulfuric acid should preferably be the phenol which is obtained as the end product. For instance, when 1,3,5-triisopropylbenzene hydroperoxide is to the cleaved, 3,5-diisopropyl phenol would be the preferred decomposition solvent to be utilized with the sulfuric acid catalyst.

In some cases, in spite of the advantages described above, it may not be desirable to use, for the decomposition reaction, the particular phenol which is the same as the phenol produced as a result of the decomposition. One reason therefore may be that the phenol may not be stable at its melting temperature. Another reason may be that the carbonyl compound formed in the cleavage reaction is apt to react with the phenol used as the decomposition agent with the formation of condensation products.

It is not necessary to limit the choice of the phenol used to any one phenol. Mixtures of two or more may be used and will give excellent results. The cleavage product of the hydroperoxidized triisopropylbenzene, for instance, contains diisopropylphenol, isopropylresorcinol, and phloroglucinol. Following the principle of using the phenol resulting from the decomposition as the decomposition agent, it is desirable in this case to use the mixture of the three mentioned phenols.

The temperature used for the reaction may vary within wide limits. These limits will generally be determined by the melting point of the reaction mixture and the boiling point of the phenol used as the decomposition agent. The temperatures which have consistently produced excellent results lie in the range between 50 and 65 degrees centigrade. It may at times be desirable to eliminate the carbonyl compound, such as acetone, formed in the reaction, to prevent its participation in side reactions. When such is the case, the reaction may be accomplished at a temperature which is above that of the boiling point of the carbonyl compound.

Some of the present advantages residing in the method of the present invention are shown by the data in the examples which follow. The data contained therein show the decomposition of cumene hydroperoxide, triisopropylbenzene hydroperoxide as a component of the original peroxidation reaction mixture, m-diisopropylbenzene hydroperoxide as a component of the original peroxidation reaction mixture, 1,3,5-triisopropylbenzene dihydroperoxide, etc., to the following phenols, respectively: phenol, 3,5-diisopropylphenol, m-isopropylphenol and 5-isopropylresorcinol. The decomposition solvents used were phenol, isopropylphenol, 3,5-diisopropylphenol, and p-cresol. The acids used were concentrated sulfuric acid, hydrogen chloride, aluminum chloride, p-toluene sulfonic acid-monohydrate, hydrogen bromide, and phenol sulfonic acid.

The process of the present invention lends itself well to continuous operation for commercial use. The reactants comprising the peroxidate and decomposition agent may be introduced continuously into the reaction chamber. The decomposed reaction mixture is continuously removed at the end of the reaction chamber.

The following examples will serve to illustrate the process of the present invention and the improvements resulting therefrom:

Example I

Sixteen grams (16 g.) of phenol containing 0.06 g. of 96 percent sulfuric acid (0.38 percent by weight of the phenol and 0.16 percent by weight of the hydroperoxide below) were weighed into a 100 ml. capacity three-necked, round-bottomed flask, equipped with a stirrer, a thermometer, and a dropping funnel. The phenol was brought to a temperature of 55 degrees centigrade and 50 cc. (52.2 g.) of commercial 70 percent cumene hydroperoxide added via the dropping funnel over a period of 15 minutes. Heat was evolved and the temperature of the reaction vessel was held at 55 degrees ±2 degrees centigrade during the addition. After cooling for fifteen minutes, the reaction was complete as shown by peroxide analysis. The yield of acetone as shown by the hydroxylamine hydrochloride method (M. Marasco, Ind. Eng. Chem. 18, 701 (1926)) was 14.2 g. (99 percent of theory). An equivalent yield of phenol was obtained. In this and in all of the following examples, percent hydroperoxide refers to the percent by weight hydroperoxide as determined by the method of Wagner, Smith and Peters (Ind. Eng. Chem., Anal. Edition 19, 976 (1947)), and calculated as the monohydroperoxide of the aralkyl hydrocarbon.

Example II

The procedure of Example I was duplicated using 0.0016 g. of sulfuric acid (0.011 percent based on the weight of the hydroperoxide) in 16 g. of 3,5-diisopropylphenol and 44.1 g. of 1,3,5-triisopropylbenzene oxidation product containing 32.3 percent hydroperoxide (calculated as monohydroperoxide in this and succeeding examples.) The yield of acetone was 3.0 g. (85.4 percent of theory and the amount of hydroxy compounds formed (calculated as 3,5-diisopropyl phenol) was 10.29 g. (95.6 percent of theory). Hydroxy compounds were determined by the acetylation method of S. Siggia, (Quantitative Organic Analysis via Functional Groups, John Wiley and Sons, New York 1949). Equally good yields of acetone were obtained when larger quantities of sulfuric acid were used, for example 0.03 or 0.06 gm. (0.4 percent based on the hydroperoxide) of sulfuric acid instead of the 0.0016 gm. used above.

Example III

An oxidation product was prepared by bubbling oxygen at a rate of 7.7 l./min. through 478 grams of 1,3,5-triisopropylbenzene containing 1.2 percent hydroperoxide, for sixteen minutes at a temperature of 149–151 degrees centigrade. The increase in weight of the material was 12.9 grams and analysis showed a hydroperoxide concentration of 20.1 percent. These data indicate an oxidation yield of 97 percent.

Four hundred and fifty-three grams (453 g.) of the above hydroperoxide solution were added over a 15 minute period to 144 grams of 3,5-diisopropylphenol and 0.6 grams (0.66 percent based on the weight of the hydroperoxide) of concentrated sulfuric acid contained in a one liter, three-necked flask equipped with a stirrer, a dropping funnel, and a thermometer. The phenol-sulfuric acid mixture was heated to 55 degrees and maintained at this point throughout the addition. The product was then allowed to cool to room temperature at which time the decomposition of the hydroperoxide was complete.

The product was analyzed by fractional distillation through a two foot, one-inch inside diameter fractionating column packed with 0.16 in. x 0.16 in. protruded packing of 316 stainless steel, first at atmospheric pressure until all of the acetone had been removed and finally at 20 mm. of mercury for the remainder of the distillation. The product contained 15.4 g. of acetone (70 percent of theory) 364.5 grams of 1,3,5-triisopropylbenzene, 207 grams of 3,5-diisopropylphenol of which 63 grams were formed in the reaction (90 percent of theory), 1 gram of 5-isopropyl resorcinol and 5 grams of still residue.

Example IV

The procedure of Example I was applied to several different phenols and hydroperoxides as indicated in the table which follows. In each case 50 cc. of the hydroperoxide solution was added to a mixture of 16 gm. of the phenol and 0.06 gm. of concentrated sulfuric acid.

| Solvent | Hydroperoxide | Acetone Yield, percent Theory |
|---|---|---|
| Phenol | Cumene | 99.1 |
| p-Cresol | do | 96.5 |
| m-Isopropylphenol | do | 97.5 |
| 3,5-Diisopropylphenol | do | 95.8 |
| Phenol | 1,3,5-Triisopropylbenzene-mono-. | 98.2 |
| m-Isopropylphenol | do | 95.4 |
| p-Cresol | do | 97.2 |
| 3,5-Diisopropylphenol | do | 99.0 |
| Phenol | 1,3,5-Triisopropylbenzene di- | 98.1 |
| Do | m-Diisopropylbenzene | 93.0 |
| m-Isopropylphenol | do | 90.0 |

Cumene hydroperoxide was used in the form of the commercial 70 percent material. Triisopropylbenzene monohydroperoxide was used in the form of the peroxidation product of triisopropylbenzene containing 32.3 percent hydroperoxide. In the case of triisopropylbenzene dihydroperoxide a solution of 5 gm. of the dihydroperoxide in 40 gm., triisopropylbenzene was employed. The m-diisopropylbenzene hydroperoxide was a peroxidation product of m-diisopropylbenzene containing 32.6 percent hydroperoxide.

Example V

The concentration of solvent phenol may be varied over a considerable range with little effect on the yield of products. The procedure of Example I was followed using 0.03 gm. (0.3 percent based on the weight of the hydroperoxide) of concentrated sulfuric acid dissolved in from 12 to 20 gm. of 3,5-diisopropylphenol. In each case 50 cc. (43.7 g) of a triisopropylbenzene oxidation product containing 22.7 percent hydroperoxide was used.

Results were as follows:

| 3,5-Diisopropylphenol, gm. | Acetone, Percent Yield |
|---|---|
| 12 | 96.5 |
| 16 | 97.9 |
| 20 | 97.5 |

Example VI

The equipment described in Example I was charged with 16 g. of 3,5-diisopropylphenol and 0.06 g. of sulfuric acid and the contents heated to 55 degrees centigrade. A suspension of the trihydroperoxide of 1,3,5-triisopropylbenzene (3 grams of 93 percent trihydroperoxide in 40 g. of 1,3,5-triisopropylbenzene) was added over a five minute period following which the mixture was allowed to cool with stirring for thirty minutes. At the end of this time the hydroperoxide was completely decomposed. A good yield of acetone was thus obtained.

The same result was obtained when an equal weight of phenol was substituted for the 3,5-diisopropylphenol.

*Example VII*

A hydroperoxide solution was prepared by passing oxygen at the rate of ⅓ liter per minute through 86 g. of durene (1,2,4,5-tetramethylbenzene) for 130 minutes at 148–152 degrees. Analysis of the product indicated that it contained 13.3 percent by weight of hydroperoxide.

A 45.2 g. portion of this product (equivalent to 6 g. durene hydroperoxide) was mixed with 16.3 g. to 2,4,6-trimethyl phenol and the mixture was heated to 75 degrees with agitation. Concentrated sulfuric acid (0.03 ml.) (0.83 percent based on the weight of the hydroperoxide) was added and the temperature rose to 83 degrees. After 12 minutes substantially all the hydroperoxide in the solution had been decomposed as known by titration. The sulfuric acid was then neutralized by addition of aqueous sodium hydroxide. The product had the odor of formaldehyde and titration of it by the hydroxylamine hydrochloride method indicated a high yield of formaldehyde had resulted. For further confirmation an aqueous extract of the product was treated with 2,4-dinitrophenyl hydrazine and there was thus obtained formaldehyde 2,4-dinitrophenyl hydrazone which was identified by mixed melting point with authentic material.

*Example VIII*

Acids other than sulfuric may also be employed, together with phenols, for the desired decomposition of aralkyl hydroperoxides.

About 12 gallons of 1,3,5-triisopropyl benzene were oxidized with excess air in a multistage tubular reactor. The reaction was conducted at 150 degrees centigrade ±5 degrees and 80 pounds pressure using co-current flow of hydrocarbon and air, hydrocarbon being continuously introduced and product continuously withdrawn throughout the operation. A portion of the product withdrawn just before completion of the operation and containing 24.5 percent hydroperoxide was used for the following experiments.

In these experiments the procedure of Example I was followed using 50 cc. (43.5 g.) of the oxidate. Varying amounts of acid were used and the amounts of hydroperoxide remaining in solution after the reaction period were measured. Results are summarized in the table.

| Acid | Wt. acid, grams | Percent Hydroperoxide remaining in product after reaction | Yield acetone, percent of theory |
| --- | --- | --- | --- |
| HCl | 0.06 | 0 | 71.7 |
| AlCl$_3$ | 0.06 | 5.4 | 75.2 |
| p-Toluene sulfonic Acid monohydrate | 0.06 | 0 | 85.0 |
| HBr | 0.06 | 7.0 | 76.6 |
| Phenol sulfonic acid | 0.12 | 0 | 88.4 |
| H$_2$SO$_4$ | 0.016 | 0 | 86.0 |

*Example IX*

The decomposition of aralkyl hydroperoxides in mixtures of phenols with acids may also be run continuously. Moreover, the phenol employed as solvent for the acid need not be highly purified.

1,3,5-triisopropyl benzene was oxidized continuously in a one stage tubular reactor with excess air, its temperature being maintained at 150 degrees ±2 degrees and the operating pressure at 80 pounds per square inch. This yielded an oxidate containing 23 percent hydroperoxide.

The oxidate was fed continuously into a coil reactor along with 10–25 percent of its own weight of a 0.03–0.1 percent solution of sulfuric acid in crude 3,5-diisopropyl phenol. The coil temperature was maintained at 60–65 degrees centigrade and about 10 minutes contact time was allowed. The decomposition products were worked up according to the procedure of Example III and comparable yields of diisopropyl phenol and acetone were obtained. The crude diisopropyl phenol was the total product remaining after the triisopropyl benzene had been distilled out of a previously prepared decomposition product and therefore contained 5-isopropyl resorcinol, phloroglucinol and other by-products. Similar results were obtained with a crude diisopropyl phenol in which these by-products had been concentrated by distilling off about 75 percent of the 3,5-diisopropyl phenol.

Examples X through XV following show how hydroperoxides can be cleaved by using a concentrated strong acid dissolved in another non-aqueous solvent. Although the use of concentrated strong acid dissolved in this other non-aqueous solvent constitutes an effective means of cleaving hydroperoxides and of synthesizing the new phenols 3,5-dibutyl phenol and 3,5-dicyclohexyl phenol it will be noted that the yields of cleavage products recorded are inferior to those using the claimed process of this invention which use the before-described solutions of concentrated strong acids in phenols. By the use of this technique it is demonstrated how two new phenolic substances can be prepared, namely, 3,5-dibutyl phenol and 3,5-dicyclohexyl phenol.

*Example X*

1,3,5-triethylbenzene was partially peroxidized by heating it to 155 degrees centigrade and bubbling excess oxygen thru it for thirty minutes at this temperature. Analysis of the product showed the presence of 21.5 percent hydroperoxide.

The product (93 gm.) was decomposed by adding it to a solution of 0.03 gm. concentrated sulfuric acid in 30 cc. of glacial acetic acid at 55 degrees and reacting at this temperature for about seven hours until the hydroperoxide had been cleaved. Distillation of the cleavage product gave a liquid containing acetaldehyde, identified as its 2,4-dinitrophenylhydrazone by mixed melting point determination. The distillation residue was washed with water. Extraction of the residue with aqueous alkali followed by neutralization of the extract with dilute hydrochloric acid yielded 3,5-diethyl phenol M.P. 76–77 degrees, identified by mixed melting points of the phenol and of its 3,5-dinitrobenzoate with authentic materials.

*Example XI*

1,3,5-tributylbenzene was prepared by reacting 1 mole of benzene and 3 moles of butene-2 in the presence of 0.07 mole anhydrous aluminum chloride at 70–80 degrees. After decomposition of the aluminum chloride complex in the usual way the product was subjected to fractional distillation and yielded 0.4 mole of 1,3,5-tributyl benzene boiling from 136–137 degrees, at 12 mm. and having a density $d_4^{25}$ 0.843 and a refractive index $n_D^{25}$ 1.4805. The positioning of the butyl groups was established by oxidation of the hydrocarbon with a mixture of sodium dichromate and H$_2$SO$_4$ which yielded trimesic acid, identified by its melting point and by conversion to its methyl ester.

The tributylbenzene was partially peroxidized by heating it to 160 degrees centigrade and passing oxygen through it for forty-five minutes. The oxidation product contained 22.5 percent hydroperoxide. An 82 gm. portion of the product was cleaved by adding it to 0.06 gm. concentrated sulfuric acid in thirty cc. of glacial acetic acid and reacting for about one hour at 55 degrees to disappearance of hydroperoxide. The cleavage product was then washed with water. By extraction of the washed cleavage product with Claisen alkali, neutralization with dilute hydrochloric acid and distillation in vacuum, crude 3,5-dibutyl phenol was obtained. On recrystallization the 3,5-dibutyl phenol melted at 45–46 degrees and combustion analysis showed C 81.9, 81.6 percent; H 10.98, 11.00 percent (calc. for dibutyl phenol C 81.55 percent; H 10.67 percent). By distillation of the cleavage product prior to washing and extraction and treatment of the distillate with 2,4-dinitrophenylhydrazine methyl ethyl ketone may be obtained in the form of its 2,4-dinitrophenylhydrazone.

*Example XII*

1,3,5-tricyclohexylbenzene (M.P. 71.8–72 degrees) was peroxidized at 100–115 degrees by bubbling air through it for thirty hours. The product contained 8.9 percent hydroperoxide.

Using a procedure similar to that described in the preceding example forty gm. of this product was decomposed with a solution of 0.06 gm. of concentrated sulfuric acid and the phenolic product was extracted. The phenolic product after two crystallizations from petroleum ether melted at 115–115.5 degrees centigrade and contained C 82.09 percent; H 10.34 percent; calculated for 3,5-dicyclohexylphenol C 83.7 percent; H 10.07 percent. By distillation of the cleavage solution remaining after the alkaline extraction and treatment of the distillate with 2,4-dinitrophenylhydrazine, there was obtained cyclohexanone in the form of its 2,4-dinitrophenylhydrazone M.P. 162–163 degrees alone and in mixture with authentic material.

*Example XIII*

Propylene was passed into an agitated mixture of 276 gm. toluene and 28 gm. anhydrous aluminum chloride at 80 degrees until about 252 gm. had been absorbed. The product was separated from catalyst, washed and distilled to give 146 gm. of a diisopropyl toluene fraction $b_{30}$ 116.5 degrees and having $n_D^{25}$ 1.4893. The diisopropyl toluene was peroxidized by a procedure similar to that of Example X giving a product containing 20.2 percent hydroperoxide.

About 89 gm. of the peroxidized product were decomposed by adding it slowly to a stirred solution of 0.06 gm. of concentrated sulfuric acid in 30 cc. of glacial acetic acid and reacting for about forty minutes at 25–55 degrees centigrade. On working up the cleavage product as described in Example XI there was obtained 8 g. 3,5-methylisopropyl phenol identified by mixed melting point of its phenyl methane with authentic material.

*Example XIV*

A stream of oxygen was bubbled thru 1,3,5-dimethylisopropyl benzene for about four hours at 154 degrees until the product contained 20.5 percent hydroperoxide.

A 58 g. portion of the product was cleaved by a procedure similar to that of Example X. The cleavage mixture was washed with 200 g. of water and from the wash water on distillation was obtained acetone, identified as its 2,4-dinitrophenylhydrazone by mixed melting point with authentic material.

Extraction of the washed cleavage product with alkali and neutralization of the extract gave 3,5-dimethylphenol (2 gm.) identified by mixed melting point with commercial material.

*Example XV*

Propylene was passed into a stirred mixture of 1733 gm. ethylbenzene and 154 g. anhydrous aluminum chloride until 1400 gm. had been absorbed. The product was separated from catalyst, washed and fractionally distilled to yield 385 gm. of a 1,3,5-diisopropyl ethylbenzene fraction boiling at 227–228 degrees and having $n_D^{25}$ 1.4890. Positioning of the alkyl groups was established by oxidation of the hydrocarbon with a mixture of sodium dichromate and sulfuric acid which yielded trimesic acid, identified by its melting point and by conversion to its methyl ester.

Air was bubbled at about four liters per minute thru 297 g. of the 1,3,5-diisopropylethylbenzene for ninety minutes at 140–143 degrees. The peroxidation product contained 24.0 percent hydroperoxide and was cleaved by the procedure of Example X. Cleavage products were worked up as in Example XIV and yielded acetaldehyde, identified as its 2,4-dinitrophenylhydrazone and 3,5-diisopropylphenol identified by mixed melting point of its 3,5-dinitrobenzoate with authentic material.

Although the present invention has been described with a certain degree of particularity, it is understood that the present disclosure has been made only by way of example, and that numerous changes in details of composition and procedure may be resorted to without departing from the spirit and the scope of the invention as hereinafter claimed.

This application is a continuation-in-part of my co-pending application S.N. 456,313, filed September 15, 1954, now abandoned.

I claim:

1. The process for the production of a phenol and a compound selected from the group consisting of ketones and aldehydes which comprises decomposing the peroxidation product of a hydrocarbon having the general structure:

wherein R and $R_1$ are selected from the group consisting of lower alkyl and hydrogen radicals and Ar is selected from the group consisting of phenyl and lower alkyl-substituted phenyl radicals; in a substantially anhydrous mixture consisting essentially of the peroxidation product, a phenol material selected from the group consisting of phenol, resorcinol, phloroglucinol, lower alkyl-substituted derivatives thereof, and mixtures thereof and a concentrated strong acid selected from the group consisting of sulfuric acid, hydrogen chloride, hydrogen bromide, aluminum chloride, p-toluene sulfonic acid-monohydrate, and phenol sulfonic acid, the concentration of said acid in the mixture being between about 0.001 percent and about 1 percent by weight of the hydroperoxide.

2. The process for the production of a phenol and a ketone which comprises decomposing the peroxidation product of an α,α-dialkyl phenyl methane wherein the alkyl radicals are lower alkyls in a substantially anhydrous mixture consisting essentially of the peroxidation product, a phenol material selected from the group consisting of phenol, resorcinol, phloroglucinol, lower alkyl-substituted derivatives thereof, and mixtures thereof and a concentrated strong acid selected from the group consisting of sulfuric acid, hydrogen chloride, hydrogen bromide, aluminum chloride, p-toluene sulfonic acid-monohydrate, and phenol sulfonic acid, the concentration of said acid in the mixture being between about 0.001 percent and about 1 percent by weight of the hydroperoxide.

3. The process for the production of a phenol and acetone which comprises decomposing the peroxidation product of α,α-dimethylphenyl methane in a substantially anhydrous mixture consisting essentially of the peroxidation product, a phenol material selected from the group consisting of phenol, resorcinol, phloroglucinol, lower alkyl-substituted derivatives thereof, and mixtures thereof and a concentrated strong acid selected from the group consisting of sulfuric acid, hydrogen chloride, hydrogen bromide, aluminum chloride, p-toluene sulfonic acid-monohydrate, and phenol sulfonic acid, the concentration of said acid in the mixture being between about 0.001 percent and about 1 percent by weight of the hydroperoxide.

4. The process for the production of 3,5-diisopropylphenol, 5-isopropylresorcinol and acetone which comprises decomposing the peroxidation product of 1,3,5-triisopropylbenzene in a substantially anhydrous mixture consisting essentially of the peroxidation product, a phenol material selected from the group consisting of phenol, resorcinol, phloroglucinol, lower alkyl-substituted derivatives thereof, and mixtures thereof and a concentrated strong acid selected from the group consisting of sulfuric acid, hydrogen chloride, hydrogen bromide, aluminum chloride, p-toluene sulfonic acid-monohydrate, and phenol sulfonic acid, the concentration of said acid in the mixture being between about 0.001 percent and about 1 percent by weight of the hydroperoxide.

5. The process for the production of 5-isopropylresorcinol and acetone which comprises decomposing the dihydroperoxide of 1,3,5-triisopropylbenzene in a substantially anhydrous mixture consisting essentially of the peroxidation product, a phenol material selected from the group consisting of phenol, resorcinol, phloroglucinol, lower alkyl-substituted derivatives thereof, and mixtures thereof and a concentrated strong acid selected from the group consisting of sulfuric acid, hydrogen chloride, hydrogen bromide, aluminum chloride, p-toluene sulfonic acid-monohydrate, and phenol sulfonic acid, the concentration of said acid in the mixture being between about 0.001 percent and about 1 percent by weight of the hydroperoxide.

6. The process for the production of 5-isopropylresorcinol and acetone which comprises decomposing the peroxidation product of 1,3,5-triisopropylbenzene in a substantially anhydrous mixture consisting essentially of the peroxidation product, 5-isopropylresorcinol and concentrated sulfuric acid, the concentration of said acid in the mixture being between about 0.001 percent and about 1 percent by weight of the hydroperoxide.

7. The process for the production of resorcinol and acetone which comprises decomposing m-diisopropylbenzene dihydroperoxide in a substantially anhydrous mixture consisting essentially of the peroxidation product, a phenol material selected from the group consisting of phenol, resorcinol, phloroglucinol, lower alkyl-substituted derivatives thereof, and mixtures thereof and concentrated sulfuric acid, the concentration of said acid in the mixture being between about 0.001 percent and about 1 percent by weight of the hydroperoxide.

8. The process for the production of resorcinol and acetone which comprises decomposing the peroxidation product of m-diisopropylbenzene in a substantially anhydrous mixture consisting essentially of the peroxidation product, resorcinol and concentrated sulfuric acid, the concentration of said acid in the mixture being between about 0.001 percent and about 1 percent by weight of the hydroperoxide.

9. The process for the production of phloroglucinol and acetone which comprises decomposing the peroxidation product of 1,3,5-triisopropylbenzene in a substantially anhydrous mixture consisting essentially of the peroxidation product, a phenol material selected from the group consisting of phenol, resorcinol, phloroglucinol, lower alkyl-substituted derivatives thereof, and mixtures thereof and concentrated sulfuric acid, the concentration of said acid in the mixture being between about 0.001 percent and about 1 percent by weight of the hydroperoxide.

10. The process for the production of m-isopropylphenol which comprises decomposing m-diisopropylbenzene monohydroperoxide in a substantially anhydrous mixture consisting essentially of the peroxidation product, a phenol material selected from the group consisting of phenol, resorcinol, phloroglucinol, lower alkyl-substituted derivatives thereof, and mixtures thereof and concentrated sulfuric acid, the concentration of said acid in the mixture being between about 0.001 percent and about 1 percent by weight of the hydroperoxide.

11. The process for the production of a phenol and formaldehyde which comprises decomposing the peroxidation product of a compound selected from phenyl methane and a lower alkyl-substituted phenyl methane in a substantially anhydrous mixture consisting essentially of the peroxidation product, a phenol material selected from the group consisting of phenol, resorcinol, phloroglucinol, lower alkyl-substituted derivatives thereof, and mixtures thereof and a concentrated strong acid selected from the group consisting of sulfuric acid, hydrogen chloride, hydrogen bromide, aluminum chloride, p-toluene sulfonic acid-monohydrate, and phenol sulfonic acid, the concentration of said acid in the mixture being between about 0.001 percent and about 1 percent by weight of the hydroperoxide.

References Cited in the file of this patent

UNITED STATES PATENTS

| 2,669,588 | Deming et al. | Feb. 16, 1954 |

FOREIGN PATENTS

| 510,936 | Belgium | May 15, 1952 |
| 510,937 | Belgium | May 15, 1952 |
| 861,251 | Germany | Apr. 2, 1953 |